United States Patent [19]
von der Heide et al.

[11] Patent Number: 5,225,746
[45] Date of Patent: Jul. 6, 1993

[54] APPARATUS AND METHOD FOR CONTROLLING BRUSHLESS ELECTRIC MOTORS

[75] Inventors: Johann von der Heide, Schramberg; Michael Hermann, Villingen-Schwenningen; Uwe Mueller, Eisenbach, all of Fed. Rep. of Germany

[73] Assignee: Papst-Motoren GmbH & Co. KG, St. Georgen, Fed. Rep. of Germany

[21] Appl. No.: 805,154

[22] Filed: Dec. 11, 1991

[30] Foreign Application Priority Data

Dec. 13, 1990 [DE] Fed. Rep. of Germany ....... 4039886

[51] Int. Cl.⁵ .............................................. H02P 6/02
[52] U.S. Cl. ...................................... 318/254; 318/138
[58] Field of Search ....................... 318/138, 254, 439

[56] References Cited

U.S. PATENT DOCUMENTS

| | | | |
|---|---|---|---|
| 4,074,173 | 2/1978 | Janssen | 318/138 |
| 4,511,835 | 4/1985 | Studtmann | 318/700 |
| 4,712,050 | 12/1987 | Nagasawa et al. | 318/254 |
| 5,028,852 | 7/1991 | Dunfield | 318/254 |

FOREIGN PATENT DOCUMENTS 0251785 1/1988 European Pat. Off. .
WO90/15473 12/1990 PCT Int'l Appl. .

OTHER PUBLICATIONS

N. H. Mvungi et al., "A New Sensorless Position Detector for SR Drives", Fourth International Conference on Power Electronics and Variable-Speed Devices, Jul. 19, 1992, pp. 249-252.

Y. H. Hu et al., "A Novel Implementation of a Chirp Z-transform Using a CORDIC Processor", IEEE Transactions on Acoustics, Speech and Signal Processing, vol. 38, No. 2, Feb. 1990, pp. 352-354.

Y. H. Hu, "The Quantization Effects of the CORDIC Algorithm", 1988 International Conference on Acoustics, Speech and Signal Processing, Apr. 1988, pp. 1822-1825.

*Primary Examiner*—Bentsu Ro
*Attorney, Agent, or Firm*—Finnegan, Henderson, Farabow, Garrett & Dunner

[57] ABSTRACT

A brushless direct current motor is energized by a power stage. Switches of the power stage are selectively switched by an electronic control device. In order to determine the correct commutation pattern, without using rotor position indicators, the control device is arranged to tap the power fed to the motor. The samples received by the motor, in an ordered sequence, define an analogue function whose parameters can be determined by vector addition. The computations applied to the sample enable the necessary commutating information and signals to be generated in a particularly rapid manner.

11 Claims, 7 Drawing Sheets

APPARATUS AND METHOD FOR CONTROLLING BRUSHLESS ELECTRIC MOTORS

CROSS-REFERENCE TO RELATED APPLICATION

The invention of this application is related to that of copending application Ser. No. 07/777,283, filed Nov. 29, 1991.

FIELD OF THE INVENTION

The present invention relates to apparatus and a method for controlling brushless electric motors, for example, for commutating brushless direct current motors with external position sensors. Such apparatus and methods are, for example, described in PCT application WO 90/15473 the disclosure whereof is incorporated herein by reference.

The earlier described methods permit a comparatively accurate determination of rotor positions, on the basis of which a commutation decision for a motor can be made. As a function of the given accuracy requirements, the position determination involves analysis times of varying lengths, which have a disadvantageous influence in the case of less powerful processors, particularly if there is no need for a high position determination accuracy for commutating purposes.

It is an object of the invention to reduce the computing expenditure required, particular for methods which make use of a centroid analysis or a discrete Fourier transformation.

SUMMARY OF THE PRESENT INVENTION

According to the present invention there is provided an apparatus for controlling a brushless electric motor having motor coils, the apparatus comprising a power stage having a plurality of switching means, and output terminals for supplying power to the motor coils of a motor to be controlled, and the apparatus further comprising control means coupled to said power stage and arranged to apply commutation signals to the power stage to selectively switch said switching means whereby power is selectively applied to said motor by way of said switching means, and wherein the control means is arranged to receive a sequence of samples of the power fed to the motor, and the control means further comprises means for determining parameters of an analogue function defined by said sequence of samples, said parometers being determined by a vector or complex number addition.

The invention also relates to a method of controlling a brushless electric motor having motor coils, comprising the steps of selectively supplying power to said motor coils by way of switching means, selective switching of said switching means being controlled by control means, and feeding samples of the power fed to the motor coils to said control means, and wherein for providing commutation signals to said switching means, said control means receives a sequence of said samples and determines therefrom the parameters of an analogue function defined by said sequence, said parameters being determined by a vector or complex number addition.

Although the invention is described particularly with reference to motors having six stator poles and four rotor poles, it is also suitable for other motor types and can also be used for the simplified measured valua determination of optically, magnetically and capacitively operating sensors, which can be evaluated in a comparable manner. The method requires at least two measured results to be provided and on the basis thereof the necessary, correct commutation information can be obtained.

In a technically, particularly important application, a special partial problem is to produce a correct commutating signal from a distribution of six measured values as rapidly as possible.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

Figure 1:
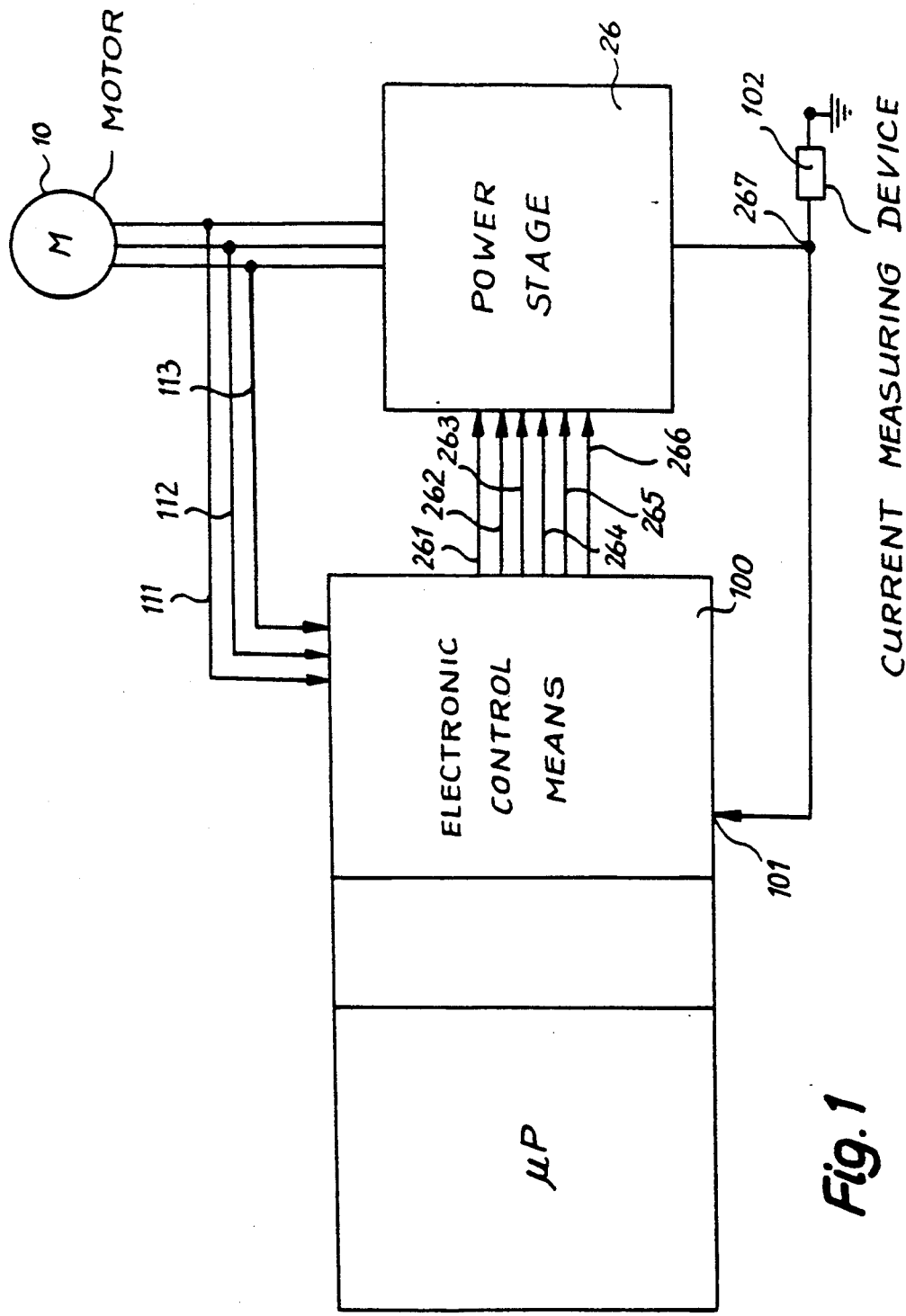
FIG. 1 shows apparatus of the invention for controlling a brushless motor.

FIG. 1 shows a block circuit diagram of apparatus of the invention for controlling a motor. Specifically, the apparatus is arranged to detect the rotation position of a brushless direct current motor 10, and to provide commutation for the motor 10 without utilising external position sensors. The apparatus comprises electronic control means 100 coupled to said motor 10 and to a power stage 26 which is arranged to selectively apply power to the phases of the motor 10. The control means 100, preferably implemented by way of a processor, is arranged to receive information on the actual status of the motor 10 either by determining the voltages applied to the coils of the motor by way of lines 111, 112 and 113, or by determining the current applied to the motor 10. The current is determined by way of a current measuring device 102 from which a voltage 267 is tapped and applied to a current input 101 of the processor 100.

The prerequisite for a current measurement is, of course, a commutation state of the motor 10 which leads to a current flow through the motor. This is brought about by way of commutating signal lines 261 to 266 which are arranged to selectively actuate switching devices (not shown) of the power stage 26 whereby a predetermined energisation of individual or selected phases of the motor 10 is achieved. The application of power to such a motor, and in particular, the switching of power to selected phases is well known and will not be described in detail here. Nevertheless, it is noted that for a brushless motor 10 with three phases, as is shown here, six commutating signal lines 261 to 266 are provided for directly operating six switches of the power stage 26. This means that there can be positive or, alternatively, negative current flows in each individual motor coil. In general, the sum of all of the individual current flows is such that there is only a single current direction at the current measuring device 102, independently of the switching state of the power stage 26.

The control means 100 is arranged to receive information on the motor status, and, in this specific case, on the rotor position of the motor. In this respect, in addition to normal commutating processes, separate commutating signals are applied as test signals to the power stage 26, such test signals being in the form of a comparatively rapid sequence. Each test signal is accompanied by a rise in the motor current over time, and these values can be detected by tapping the current at the measurement node 267. Conclusions can then be drawn about the variable inductance of a motor coil from the sequence of motor current values. This is, for example, brought about by determining the time necessary for the total motor current to exceed a predetermined threshold. In another procedure, after a predetermined time from the commencement of motor energisation, a check is made on the level of the total motor current.

As a result of the measures of the aforementioned type, a set of varying, measured values is generally obtained. These values or samples are subject to a certain, systematic distribution and on the basis thereof it is possible to determine with high accuracy the position of the rotor of the electric motor at least over 360° el. For this purpose, the distribution is subject to a pattern detection procedure in the manner described hereinafter. The result is an associated relationship between the measured values of the indicated type and a position angle, as illustrated in FIGS. 2A and 2B.

Figure 2A:
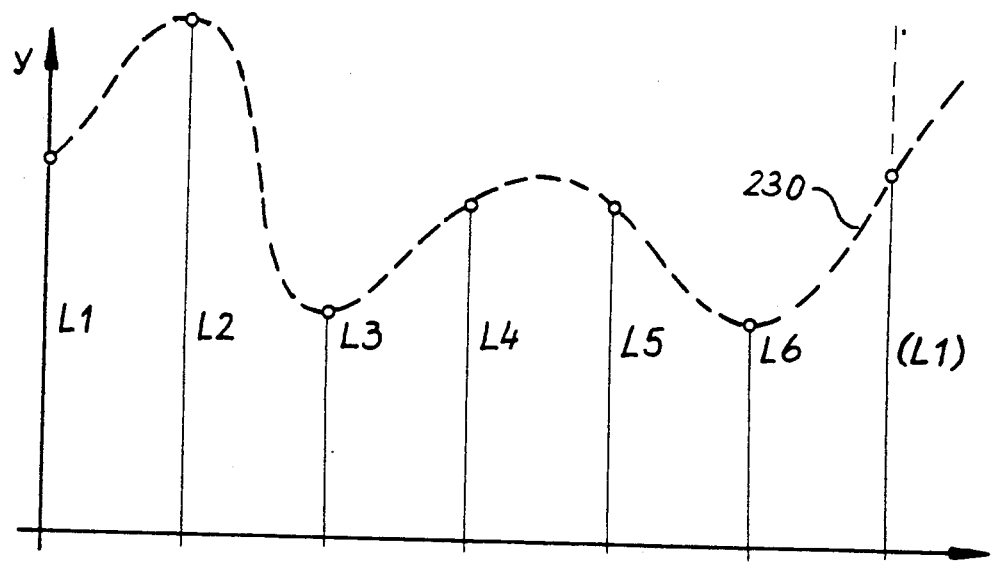
FIG. 2A shows a function based on six samples.
Figure 2B:
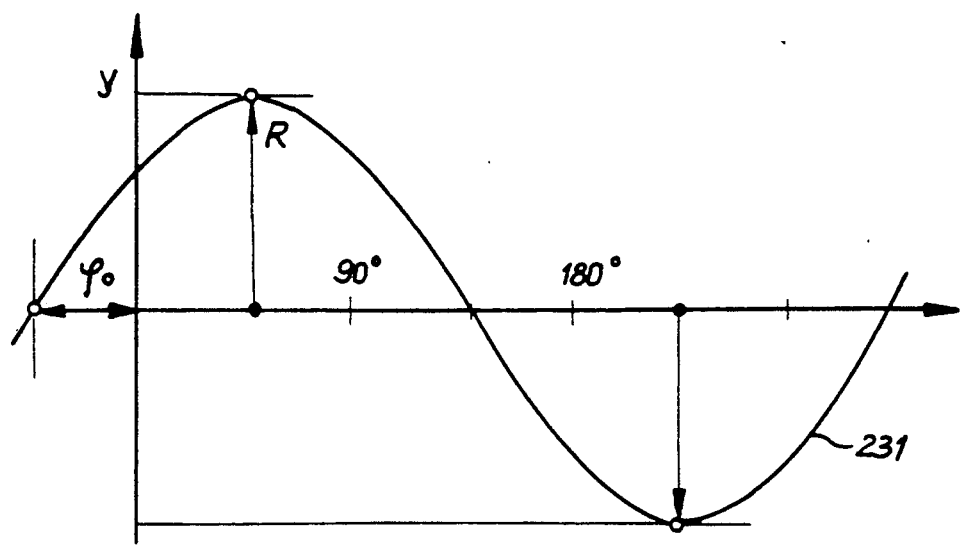
FIG. 2B shows an associated fundamental waveform and its phase position.

FIG. 2A shows a sequence of measured values spaced from left to right along the abscissa. These values L1, L2 ... L6 are uniformly spaced and may be periodically continued to the right. These measured values are the samples of a function 230, whose precise configuration is normally unknown. However, what is of interest for the present invention is a related, basic fundamental waveform 231 of the function 230. This fundamental waveform, which is shown in FIG. 2B, is sinusoidal, has an amplitude R, and a phase position with respect to the origin of FIG. 2B with the value ψ0, as is also shown in FIG. 2B. The determination of the parameters R and ψ0 takes place with a pattern detection method as is illustrated in FIG. 3.

In the case of, for example, six measured values L1, L2 ... L6, as shown in FIG. 2, the measured values are added in accordance with a vector addition. The magnitude of the individual vectors corresponds to the magnitude of the measured values. However, the direction of the individual vectors corresponds to the directions of an equilateral n-angle which rests on the abscissa. So for six measured values having positions along the abscissa of 0, 1, 2, 3, 4 and 5, the vectors representing them have the directions 0°, 60°, 120°, 180°, 240° and 300°. In an alternative formulation, the directions of the individual vectors can be described as nth roots of unity and they are then so-called complex-valued quantities. As such representations are well known to those skilled in the art, explanation thereof is neither necessary nor provided.

Figure 3:
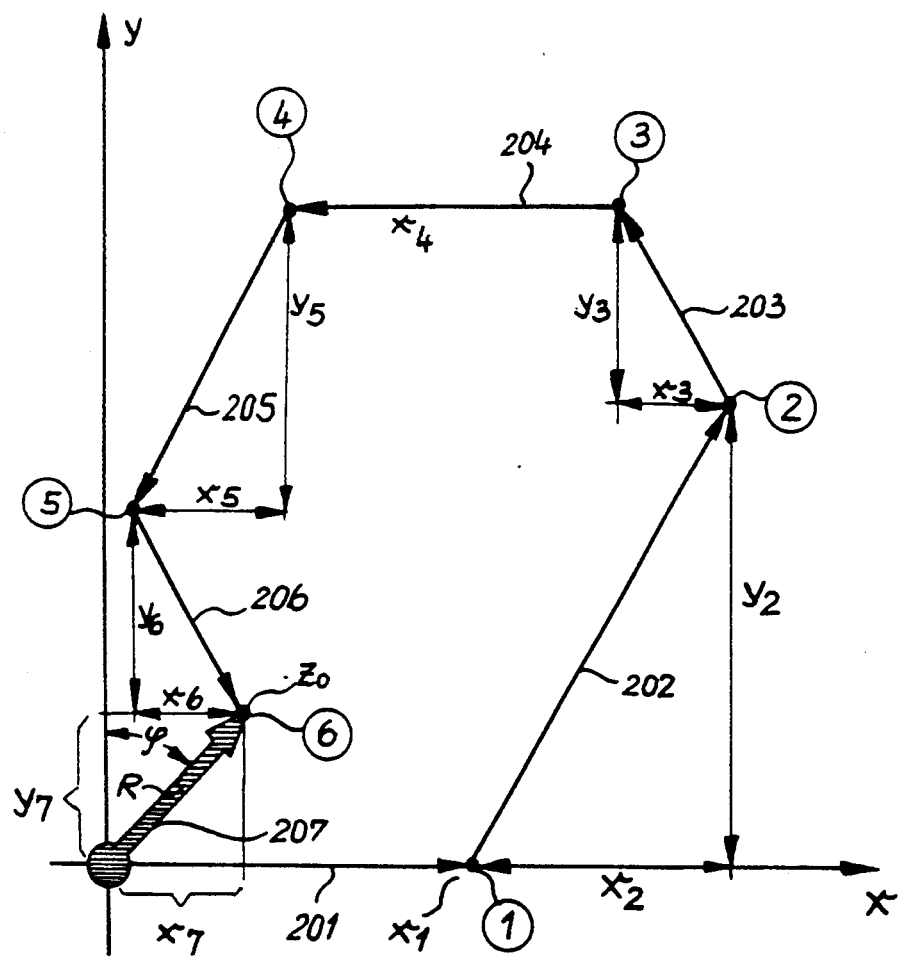
FIG. 3 is a diagram illustrating a procedure for producing commutating signals based on pattern detection, which is based on the principle of a phase position determination.

When the individual measured values of FIG. 2A are plotted as described, the result is shown in FIG. 3. In this figure the measured value L1 is represented by the vector 201, the measured value L2 by the vector 202, and so on. The resultant vector R, which has the reference numeral 207, is obtained as the result of vector addition. The length of the vector R represents the amplitude of the fundamental waveform (the so-called first harmonic) shown in FIG. 2B, and the angle ψ of the resultant vector FIG. 3 corresponds to the phase angle ψ0 of the waveform of FIG. 2B.

It is known that a motor commutation is advantageously performed precisely when the rotor of the motor has exceeded certain mechanical limit angles, which can be clearly determined by the above-described method. Thus, the control means 100 can not only determine the rotor position, but can also logically perform the necessary motor commutation, as a function of the rotor position and the given movement direction of the rotor.

Therefore the control means is responsible for determining the quantities R and ψ0. It is advantageous to limit to a minimum the time necessary for determining these quantities, so that the necessary computations can be made in real time and the determined commutations are performed without delayed.

Figure 4:
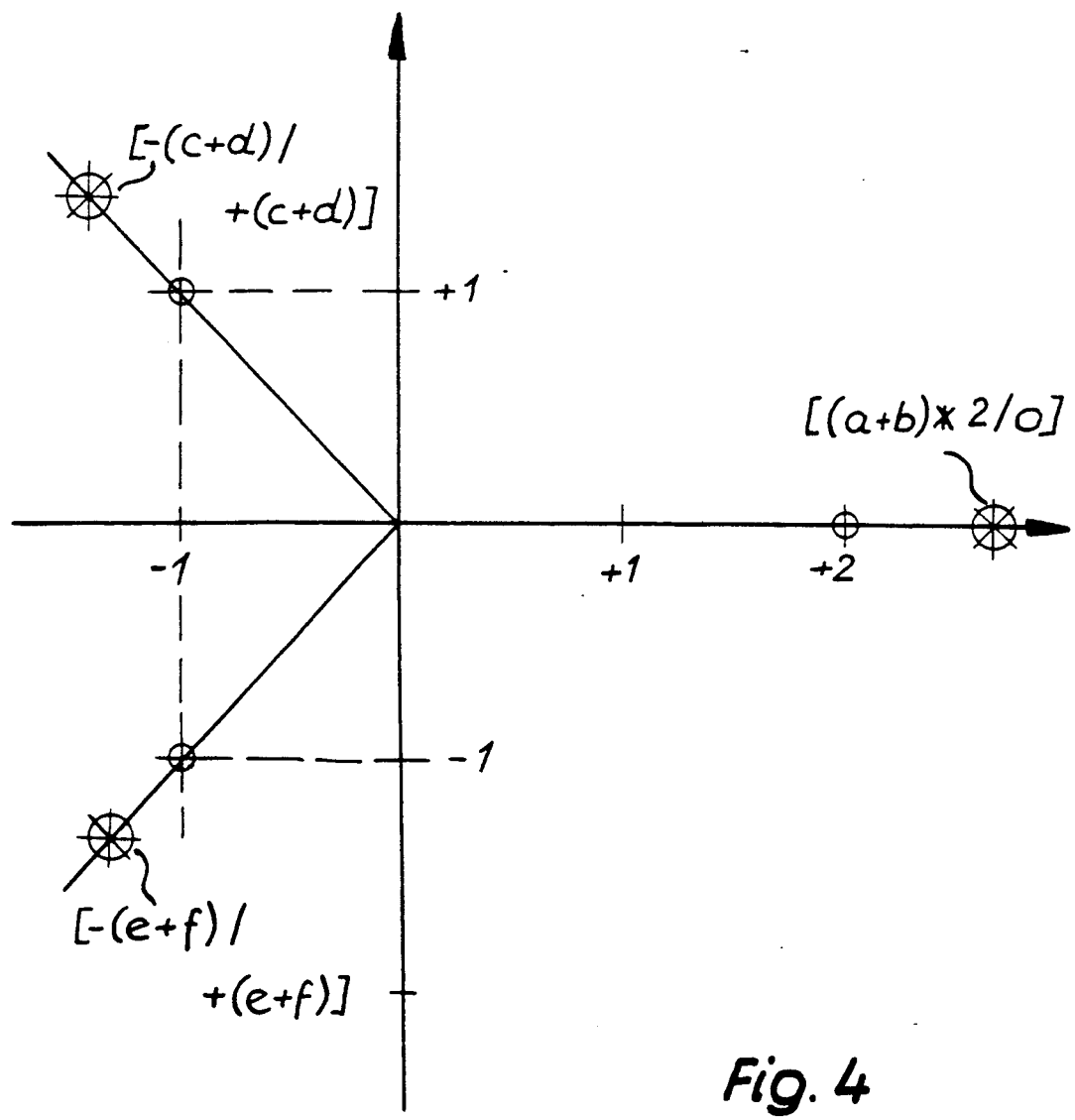
FIG. 4 is a diagram illustrating the evaluation of combined measured values.

The quantities R and ψ0 can be determined by a number of methods, in accordance with the invention. One method of determining the quantities is indicated, by way of example, in FIG. 4. In this respect, the method relates to a distribution of six measured values which, as described above, are to be combined to a summary quantity in the form of a vector.

However, instead of employing exact directions for the vectors to be added, directions are chosen having tangent values which are determined by the ratio of small integers, such as for example, 2:3, 7:8, etc. This simplifies the necessary computations.

Figures 5, 6:
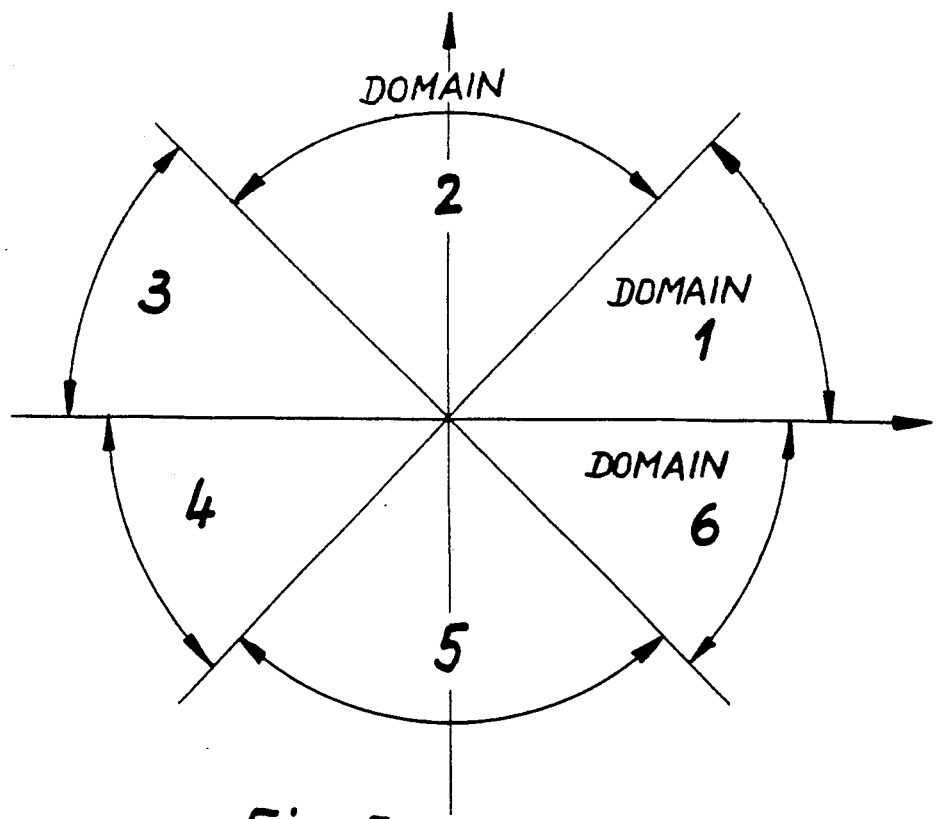
FIG. 5 is a diagram representing commutating domains.
FIG. 6 illustrates a commutation decision process.

It will be appreciated that the sequence of measured values obtained by the control means define an analogue function which represents the position of the rotor. This information can be used to determine the position of the rotor and/or to enable the generation of switching signals for the commutation. In this latter respect, the measured values are used to determine a commutation domain as is represented in FIG. 5.

The commutation domain is determined by adding the measured values by vector addition, as described above, and as illustrated by FIG. 4. Approximated weighting factors and the use of scaling factors can be utilised to simplify the computations. The commutation process still works well, even with such simplifications.

The method has the following steps. Firstly, in each case pairs of two successive measured values are added together. Thus, six measured values are combined to form three new numerical values (composite values). In a second step, a x-register and a y-register are each loaded with the value zero. In a third step, the first composite value is multiplied by two and added to the contents of the x-register, and in a fourth step the second composite value is subtracted from the contents of the x-register. In a fifth step the second composite value is added to the contents of the y-register, and in a sixth step the third composite value is subtracted from the contents of the x-register. Then, the third composite value is subtracted from the contents of the y-register. In an eighth and following steps an association is brought about between the contents of the x and y-registers and one of six commutating measures for the motor.

Once the computations have been completed, as represented by the contents of the x and y-registers, commutation signals have to be generated therefrom. The algorithm illustrated in FIG. 6 shows the decisions which are made. Thus, if the contents of the y-register equal or are greater than zero, then either commutating measure 1, 2 or 3 is chosen, whereas in other cases 4, 5 or 6 is chosen as a function of the following additional conditions. If the contents of the x-register are equal to or greater than the absolute value of the contents of the y-register, then either commutating measure 1 or 6 is to be chosen. If the contents of the x-register are smaller than the absolute value of the contents of the y-register, then one of the commutating measures 2, 3, 4, or 5 is to be chosen, as a function of the following boudary conditions. If the absolute value of the x-register is equal to or larger than that of the y-register, than the commutating measures 3 or 4 is to be chosen, whereas if the absolute value of the x-register is smaller than that of the y-register, the commutating measure 2 or 5 is to be chosen.

In a final step the commutating measure is to be carried out, that is, by providing an appropriate switching signal by way of the commutating lines 261 to 266 to the power stage 26.

In the case in which six measured values already exist, their evaluation requires approximately 60 processing steps and can therefore be performed with modern processors in roughly 5 to 10 microseconds.

An alternative method uses the same decision sequence, i.e. there is a x-register and a y-register for representing a resultant vector.

However, in this alternative method the individual measured values are not combined in pairs, but instead all of the measured values, for example, six samples, are used in accordance with the following steps. In a first step a x-register and a y-register are loaded with the value zero. In a second step the contents of the x-register are increased by twice the first measured value (i.e. by addition). In a second step both the x-register and the y-register are increased by the second measured value. In a third step the y-register is increased by the third measured value, whilst the x-register is decreased by the third measured value (i.e. by subtraction). In a fourth step the x-register is decreased by twice the fourth measured value. In a fifth step both the x-register and the y-register are reduced by the fifth measured value. In a sixth step the x-register is increased by the sixth measured value, whereas the y-register is decreased by the sixth measured value. In a seventh and following steps an association is brought about between the contents of the x and y-registers and one of six commutating measures for the motor, as described hereinbefore.

Apparatus and the method of the invention may be used not only to perform commutation of the motor, but also to interrogate the motor concerning the rotor position, for example, when the motor is stopped. For this purpose the x-register contents are divided by the contents of the y-register and converted into an angular value via the arc tan function.

Figure 8:
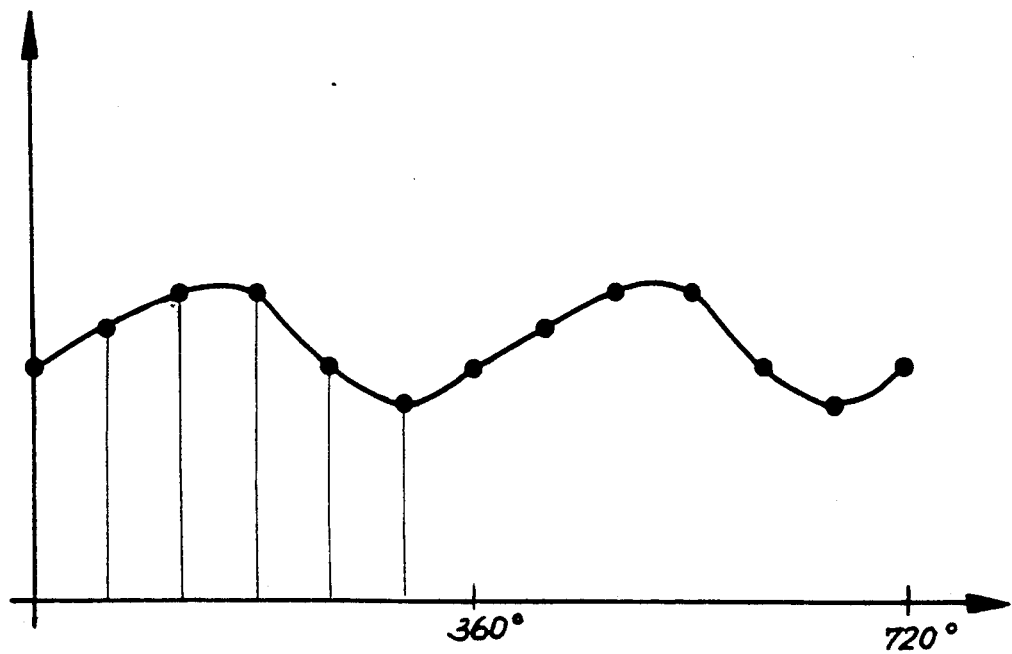
FIG. 8 shows a sequence of measured values, forming samples of a function, which is characterised by a low harmonic content, and FIG. 9 a three-dimensional representation of correction functions, whose form varies as a function of an additional parameter.

An angle found in this way normally coincides well with the angular position of a rotor (in electric angular units), provided that said measured values represent a function with a relatively low harmonic value, as shown in FIG. 8.

The association of numerically determined parameters with the true angular value of the rotor position is consequently not complicated in this case.

Figure 7:
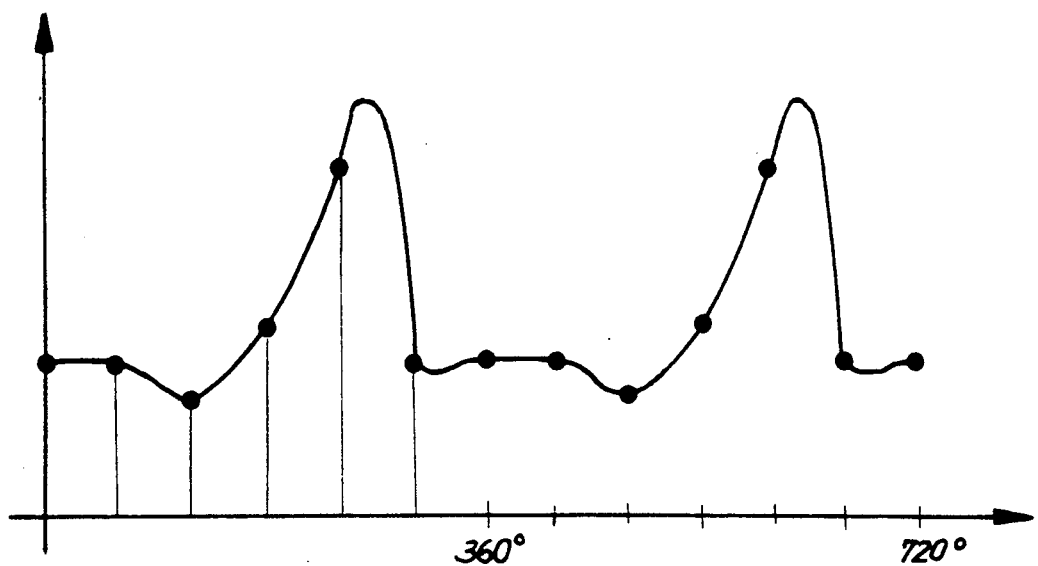
FIG. 7 shows a sequence of measured values, forming samples of a function, which is characterised by a high harmonic content.
Figure 9:
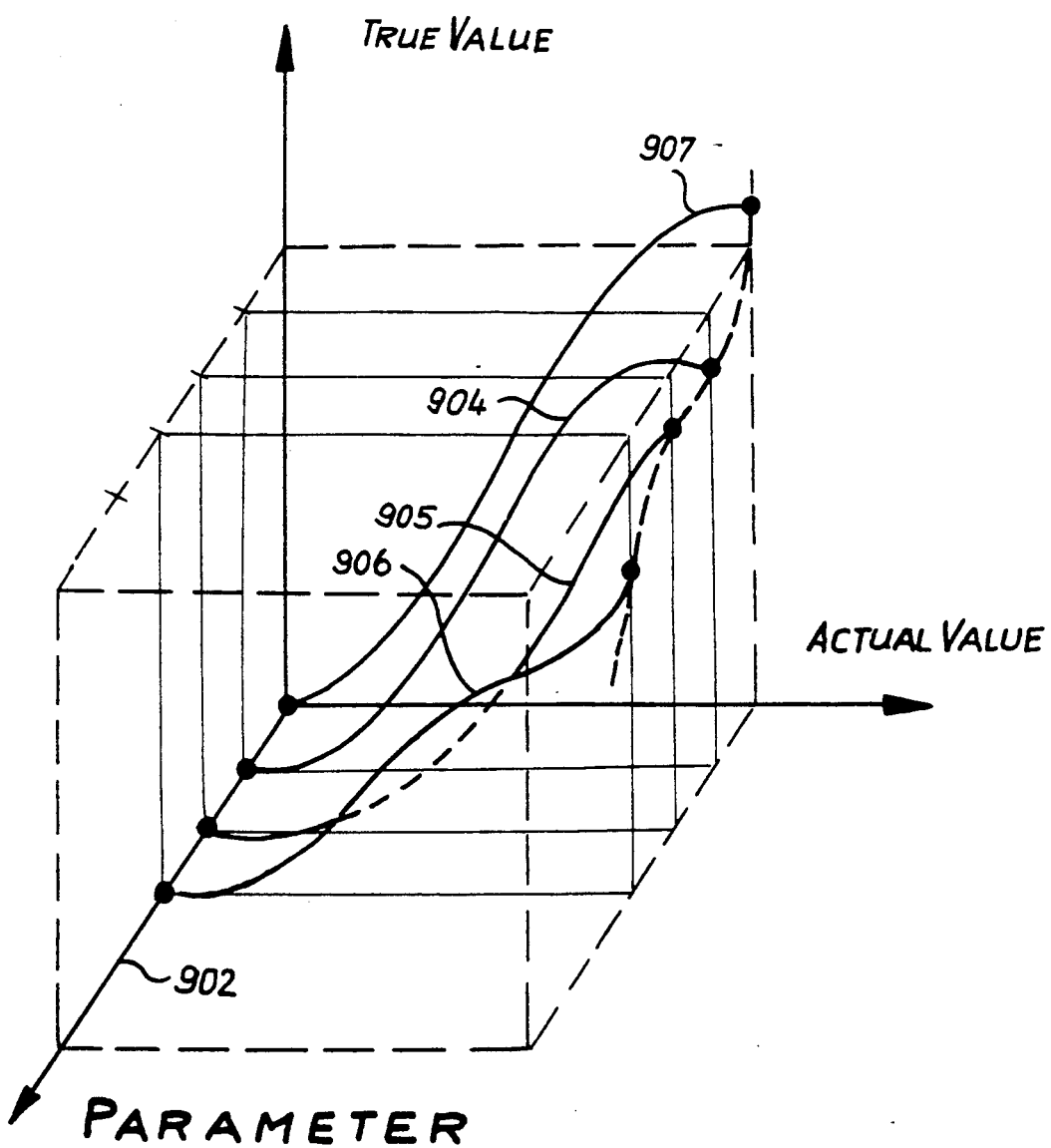

However, if the function on which the measured values are based has a high harmonic content, as shown in FIG. 7, then further method steps are need to bring about a correction of the numerically determined parameters to give a true angular value, as shown in FIG. 9.

FIG. 9 shows a three-dimensional relationship of various parameters and by means of its curves (functions) 904, 905, 906, 907 a numerically determined parameter (actual value) can be associated with the true angular value of a rotor position of this motor. Thus, it is possible to establish for each point on the curve 907 to which actual value it belongs or to which real value it belongs. Thus, each of the possible actual values is linked with the associated true values.

Curve 907 shows such an association for an example, where the measurement of the rotor position of a motor is performed at a low motor temperature. There may be a different association at higher motor temperatures and this will be represented by other curves, which should be used in such a case. This is illustrated by curves 904, 905, 906, which have a different starting point on the parameter axis 902. In this example the variable parameter is the motor temperature. In place of the temperature it is naturally possible to use one or more other parameters, such as e.g. the mean value of the test current, etc.

In another development such a table or function-controlled correction is made dependent on the level or angular position of the second or higher harmonic of a function and, as hereinbefore, such a function is represented by a number of samples, which give an ordered sequence of measured values. These measured values are in particular derived from current/time measurements on individual motor coils or relate to the succession of the values of the total motor current.

We claim:

1. Apparatus for controlling a brushless electric motor having motor coils, the apparatus comprising a power stage having a plurality of switching means and output terminals for supplying power to the motor coils of the motor to be controlled, and the apparatus further comprising control means coupled to said power stage and arranged to apply commutation signals to said power stage to selectively switch said switching means whereby power is selectively applied to said motor by way of said switching means, and wherein the control means is arranged to receive a sequence of samples of the power fed to the motor, and the control means further comprises means for determining parameters of an analogue function defined by said sequence of samples, said parameters being determined by a vector or complex number addition; and further wherein said samples received by said control means are test signals in current or voltage form which represent an ordered sequence of samples, the analogue function defined thereby being a sinusoidal fundamental wave, and wherein the phase position of said analogue function is determined by a vector addition, the directions of vectors to be added being determined by angles whose tangent values are defined by ratios of small integers.

2. Apparatus according to claim 1, wherein to generate said test signals said control means are arranged to enable a test energisation of the motor with a motor current whose intensity is chosen such that the resulting analogue function defined by the sequence of samples has a very low harmonic content.

3. A method of controlling a brushless electric motor having motor coils, comprising the steps of selectively supplying power to said motor coils by way of switching means, selective switching of said switching means being controlled by control means, and feeding samples of the power fed to the motor coils to said control means, and wherein, for providing commutation signals to said switching means, said control means receives a sequence of said samples and determines therefrom the parameters of an analogue function defined by said sequence of samples, said parameters being determined by a vector or complex number addition; and further wherein said samples received by said control means are test signals in current or voltage form which represent an ordered sequence of samples, the analogue function defined thereby being a sinusoidal fundamental wave, and wherein the phase position of said analogue function is determined by a vector addition, the directions of vectors to be added being determined by angles whose tangent values are defined by ratios of small integers.

4. A method according to claim 3, wherein the sample values are combined in pairs.

5. A method according to claim 3, wherein a motor commutation is brought about with the aid of a comparison of vector components, said vector components or their values being compared in direct form according to a decision algorithm.

6. A method according to claim 3, wherein for the purpose of a test energisation of the motor, a motor current intensity is chosen such that the associated analogue function defined by the sequence of samples has a very low harmonic content.

7. A method according to claim 6, wherein with n sampled values to be evaluated or combined, a n−1th or a n+1th harmonic is not present or is only present to a limited extent.

8. A method according to claim 3, further comprising the step of correcting a determined actual angular value to a true value by means of several individual curves or a plurality of curves, as a function of a variable parameter.

9. A method according to claim 8, wherein the temperature of the motor is the variable parameter.

10. A method according to claim 8, wherein the mean value of the motor current used for position determination purposes is the variable parameter.

11. A method according to claim 3, further comprising the steps of determining a value as a rotor position of the motor, correcting the determined value by means of a correction table or a correction curve group, whose correction values are dependent upon the phase position of the second or a higher harmonic of the analogue function defined by an ordered sequence of sampled values, said sampled values having been obtained by a sequence of motor energisations.

* * * * *